United States Patent [19]

Ziegler

[11] 4,424,046
[45] Jan. 3, 1984

[54] FLEXIBLE COUPLING

[75] Inventor: Günther Ziegler, Waldkraiburg, Fed. Rep. of Germany

[73] Assignee: SGF Suddeutsche Gelenkscheibenfabrik, GmbH & Co. KG, Waldkraiburg, Fed. Rep. of Germany

[21] Appl. No.: 194,584

[22] Filed: Oct. 6, 1980

[51] Int. Cl.³ .............................................. F16D 3/68
[52] U.S. Cl. ........................................ 464/74; 464/83
[58] Field of Search ...................... 464/73, 74, 81, 83, 464/87, 89, 92, 76

[56] References Cited

U.S. PATENT DOCUMENTS

| | | | |
|---|---|---|---|
| 2,659,219 | 11/1953 | Mosso et al. | 464/74 |
| 3,094,853 | 6/1963 | Boschi | 464/74 |
| 3,293,883 | 12/1966 | Boschi et al. | 464/83 X |
| 3,345,831 | 10/1967 | Boole | 464/83 X |
| 3,386,264 | 6/1968 | Paulsen | 464/83 X |
| 3,438,222 | 4/1969 | Paulsen | 464/83 X |

FOREIGN PATENT DOCUMENTS

| | | |
|---|---|---|
| 1266578 | 11/1968 | Fed. Rep. of Germany . |
| 1525365 | 1/1972 | Fed. Rep. of Germany . |
| 1780357 | 6/1973 | Fed. Rep. of Germany . |
| 1179828 | 5/1959 | France .................... 464/74 |

Primary Examiner—Stuart S. Levy
Assistant Examiner—Daniel P. Stodola
Attorney, Agent, or Firm—Eyre, Mann, Lucas & Just

[57] ABSTRACT

A flexible shaft-coupling of the type having one coupling part comprising a hub with arms extending radially therefrom and a second coupling part having radial projecting portions extending between the arms separated by elastic pieces therebetween. The second coupling part comprises a plurality of similar pieces, each including a V-shaped radial projection connected to wing portions extending circumferentially from the open ends of the V. The ends of the wing portions abut each other successively and are connected to form a continuous external housing having the point of each V projecting inward and each V-shape outwardly open. A plurality of drivers affixed to the opposing shaft mate with the V-shaped openings.

3 Claims, 4 Drawing Figures

FLEXIBLE COUPLING

The invention concerns a flexible shaft-coupling of the type having a first coupling part including at least three arms extending outwardly from a hub and a second coupling part comprising an equal number of inward radial projections of a surrounding piece respectively positioned between each arm, each arm and each projection being separated by intermediate elastic pieces. Each radial projection comprises two legs which form a cavity therebetween.

Such flexible shaft-couplings are also known as torsional dampers in clutches, particularly automotive disc clutches.

In a known torsional damper, both legs of each radial projection are formed by a sheetmetal strip which, viewed in the direction of the coupling axis, is hairpin shaped and whose curved part points radially outward in a manner such that the free ends of the legs are directed inward. The arms, radial projections, and elastic intermediate pieces are enclosed by an annular housing which consists of two pan-shaped housing halves which are riveted to one another and to a coupling disc externally of the arms, radial projections and elastic intermediate pieces. Axial tongues of each leg engage cutouts on the front sides of the housing halves. Each radial projection has a total of four axial tongues each of which must be mounted into a cutout of the housing when the coupling halves are joined. This mounting by itself is laborious and time consuming, and it is only after this is accomplished that the two pan-shaped housing halves may be riveted together. This also is an additionally expensive procedure. This known flexible coupling is too expensive for an ordinary shaft-coupling, and for many applications it is too bulky due to the space required by the riveting at the outer edge of the housing.

These disadvantages also are inherent in another known flexible shaft-coupling, which is also designed as a torsional damper in an automotive disc clutch, and which differs from the above-mentioned known shaft-coupling primarily in that the first coupling half, which is formed by a hub with arms that radially protrude outward, acts in conjunction with the radial projections of the second coupling half through elastic intermediate pieces which are vulcanized to the radial projections and to the hub. However, in this known known coupling, the pieces are positioned such that, because of the circumferential distances from the arms of the first coupling half, if the coupling is unloaded, the elastic intermediate pieces cannot be pre-stressed in a circumferential direction. The radial projections in this shaft-coupling are components of two congruent clover-leaf shaped crowns, which are pressed out from two sheetmetal strips. The sheetmetal strips are riveted radially externally of the clover-leaf shaped crowns, to one another and to a coupling disc. While the number of required components is small, the space requirement of the coupling is large, in relation to the turning moment that may be transferred, since the specific load-carrying ability of the elastic intermediate pieces is small. This is true both for the parts vulcanized to the hub, which are stressed in shear, and for the parts of the elastic intermediate pieces which are vulcanized to the arms and act in conjunction with the radial legs of the projections, and are not vulcanized to these legs and are also not pre-stressed in circumferential direction.

Finally, an elastic shaft-coupling similar to the type described at the outset is known in which arms of a first coupling-half arranged star fashion around a hub, and radial projections of a second coupling-half each arranged between the arms are made of two sheetmetal parts each and are joined together to form a tension sleeve to accommodate claw ends. Before mating with the corresponding claw ends, the radial projections are radially pushed inward into their mating position by a tension band that envelops the arms, the elastic intermediate pieces and the radial projections. The tension band must be removed before the coupling is placed in operation so that it will not hinder the desired relative mobility of the two coupling halves. The elastic intermediate pieces are then no longer prevented from bulging in an undefined manner, due to the pre-stressing in a circumferential direction and because of the compressive stresses that occur in operation wich are a function of moment of rotation, and because of centrifugal forces.

Such undefined bulging at least causes imbalances and even the danger that the elastic intermediate pieces will tear and will be flung away. For safety reasons it is therefore necessary that, in addition to the claws which engage in the tension bushings the one coupling-half has a housing that completely encloses the elastic intermediate pieces.

An object of the invention disclosed herein is to provide a coupling consisting of few components which is capable of being mounted in a simple manner and which coupling may be loaded, even at high rotary speeds, with moments of rotation that are high in relation to its structural volume.

According to the invention, the problem is solved by a novel shaft coupling wherein the radial projections are separate pieces, each piece comprising legs disposed in a V-shape, as viewed along the coupling axis with the point of the V directed radially inward and having a circumferentially extended wing portion at the radially outward ends of the legs. The ends of the wing portions are held together by connecting means to form a protective envelope or housing for the elastic pieces. The cavities formed between the legs of the V are open externally and mate with corresponding drivers which are axially inserted by pushing into the cavities.

Each radial projection with its legs and wings may be produced by simple punching or bending from a sheetmetal strip, yet when combined they form a housing that completely encloses the elastic intermediate pieces and which holds these elastic intermediate pieces in place in their mounting position wherein the elastic pieces are pre-stressed in a circumferential direction.

According to the invention, the drivers may be wedge-shaped inward projections of a flange of the second coupling half. The wedges fill the cavity created by the V shaped legs of the radial projections of the second coupling portion. In this case any additional housing-type component may be obviated provided the wing portions of the radial projections immediately radially supported by the drivers are sufficiently stiff or provided that the connecting elements are adapted to be stressed in tension in a circumferential direction. The drivers may alternatively be inward crimps in the envelope of a tubular or pan shaped housing of the second coupling half. This embodiment is particularly appropriate for high rotary speeds, as well as for mounting with tubular shafts which may themselves form the tubular housing of the second coupling-part.

These and other aspects of the present invention may be more fully understood with reference to the drawings wherein.

Figure 1:
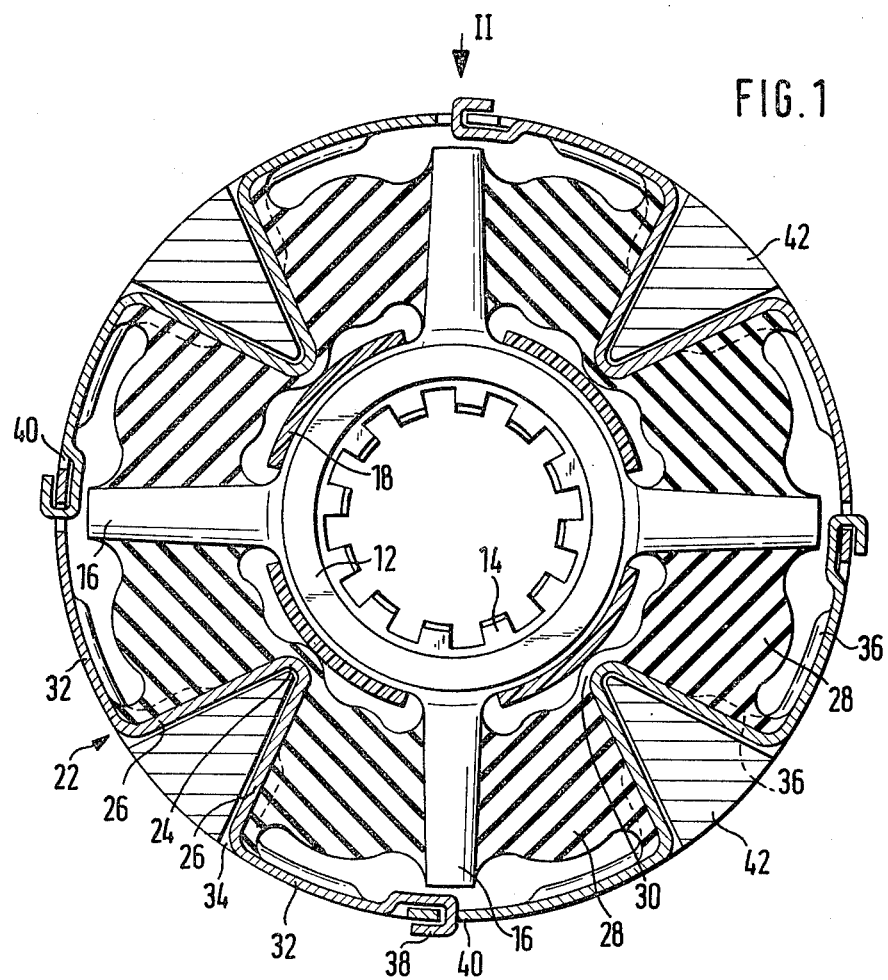
FIG. 1 is a first shaft-coupling in accordance with the invention in cross-section I—I of FIG. 2.
Figure 2:
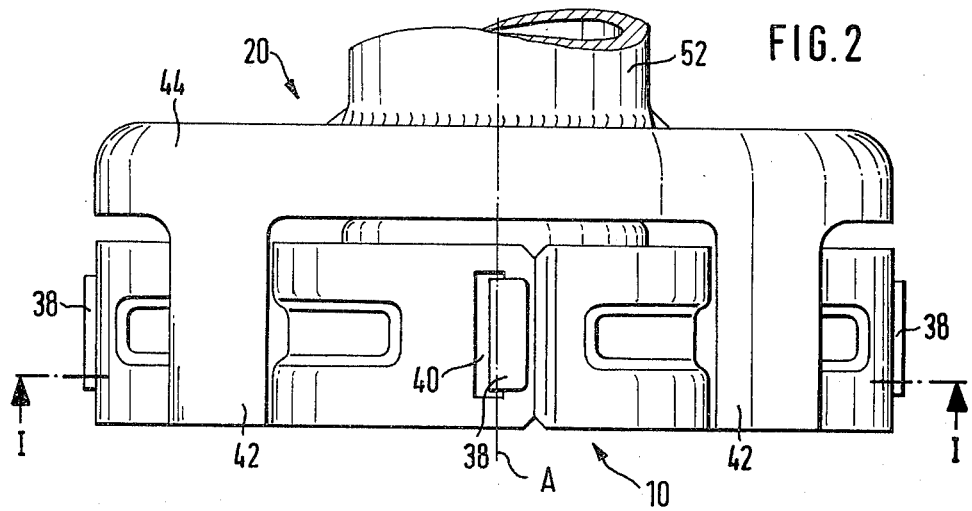
FIG. 2 is the lateral view II in FIG. 1.

Each of the two shaft-couplings illustrated in FIGS. 1-4 includes a first coupling-portion 10 including a hub 12 which has on its internal side a splining 14, for fastening to a shaft (not shown). From hub 12, four arms 16 protrude radially outward. The arms are positioned in relation to one another in equal angles of rotation. In the embodiment of FIGS. 1 and 2, hub 12 is provided with a slip surface 18 in the regions between its arms 16, such slip surface being made, for example, of a material such as polytetrafluoroethylene.

Figure 3:
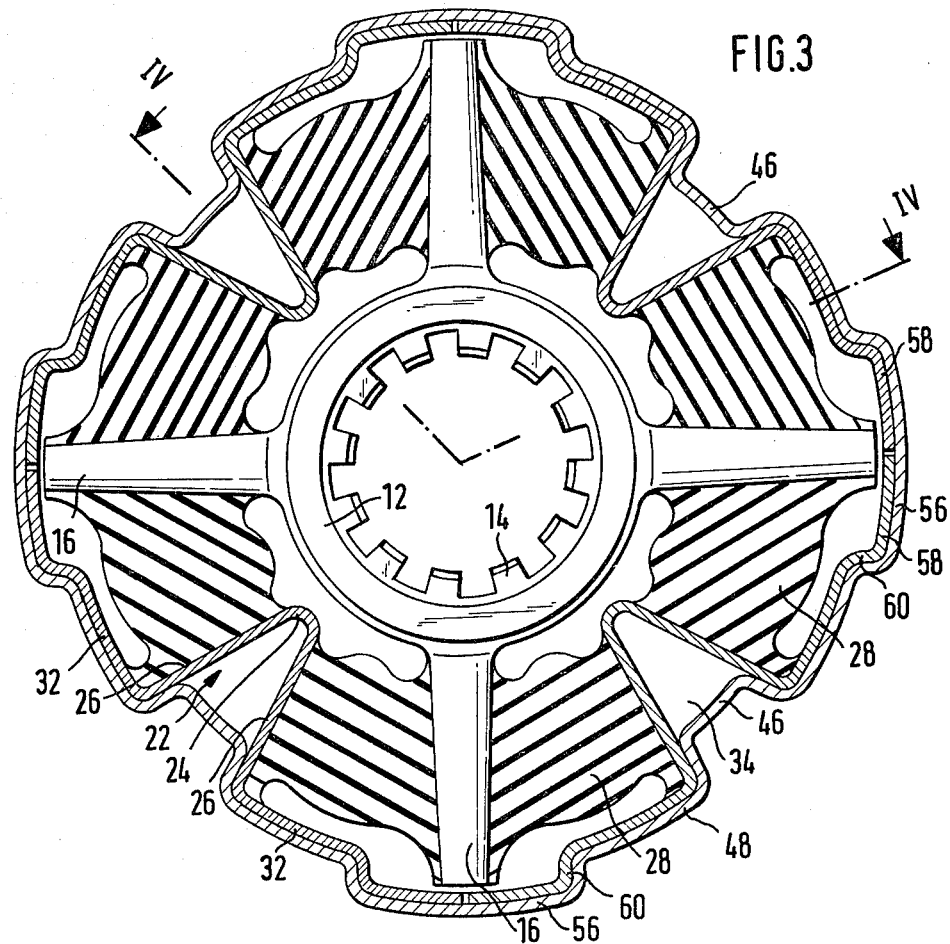
FIG. 3 is a second shaft-coupling according to the invention, in cross-section III—III of FIG. 4.

Both shaft-couplings illustrated furthermore have a second coupling-portion 20 including separate pieces which form radial projections 22 arranged between the arms 16. The number of radial projections 22 is equal to the number of arms 16; both shaft-couplings represented thus each have four radial projections 22. Each individual piece comprising a radial projection 22 is formed from a sheet-metal strip as a simple punched and bent part and in a manner such that all its bending edges are substantially parallel to the coupling axis A. This is advantageous in that complicated spatial forming, such as deep-drawing procedures, are avoided. The center of the circumferential stretch of each radial projection 22 is formed as a crest 24 pointing radially inward from which a pair of legs 26 extends outwardly in V-shape. An elastic intermediate piece 28 is vulcanized to each leg 26 and to the arm 16 that is opposite to it in a circumferential direction. To each radial projection 22 thus correspond two elastic intermediate pieces 28, which are either connected to one another as shown in FIG. 1 by means of a buffer 30 vulcanized to the crest 24, or are separated from one another as shown in FIG. 3.

From the radially external end of each leg a wing portion 32, preferably a continuation of the same sheet-metal strip as legs 26, extends in a circumferential direction, such that the cavity 34 limited by the two legs 26 remains open radially to the exterior. The transition between each leg 26 and the corresponding wing portion 32 may be stiffened, as shown in dotted lines of FIG. 1, by one or more crimps 36.

In the embodiment of FIGS. 1 and 2, at the end of one wing portion 32 of each piece carrying radial projection 22, a tab 38 is formed. The tab engages a cutout 40 at the end of the bordering wing portion 32 of the adjacent finger 22, and is bent over in hook fashion. In this manner, all the pieces are joined to form an envelope that is closed in a circumferential direction.

The pieces carrying radial projections 22 and the elastic intermediate pieces 28 of the coupling are shown in the mated position as illustrated in FIGS. 1 and 2. A plurality of drivers 42, each shaped as a wedge projecting inwardly from a flange 44 of the second coupling half 20 is inserted axially into each of the cavities 34 of the projections 22. As shown in FIGS. 1 and 2, the drivers 42 are preferably produced in one piece with flange 44, for example, by forging. The cross-section of each driver 42 is wedge-shaped so that it essentially fills the internal cavity 34 of the corresponding projection 22.

Figure 4:
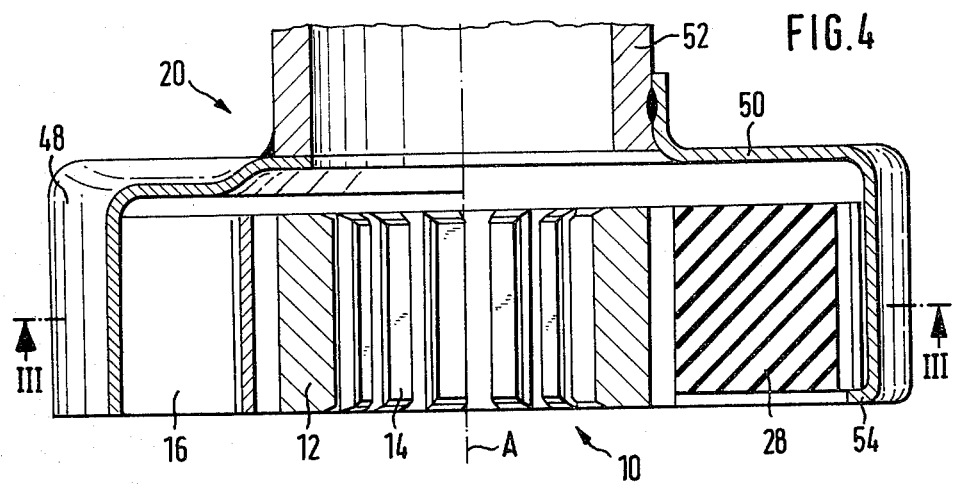
FIG. 4 is the longitudinal section Iv—IV in FIG. 3.

In the embodiment of FIGS. 3 and 4, there are also provided drivers 46, each of which engages in the internal cavity 34 of each radial projection 22, without fully filling said cavity. The drivers 46 are inwardly pressed crimps in the envelope of a pan-shaped housing 48 with annular bottom 50. The pan-shaped housing 48 takes the place of the flange 44 of the embodiment of FIGS. 1 and 2, and which, similarly to the flange, is welded to a shaft 52. In the two halves of the second coupling portions 20 illustrated in FIG. 4, two different forms of the shape of the housing 48 and bottom 50 are represented. As shown in FIGS. 3 and 4, the housing 48 holds the projections 22 and the elastic intermediate pieces 28 in their mounting position. The elastic intermediate pieces 28 are in a pre-stressed condition in a circumferential direction. In general, the frictional forces between the housing 48 and the radial projections 22, which are pushed radially outwards by the elastic intermediate pieces 28, are sufficient to prevent undesired axial relative shifts between the two. As an additional safety measure, the housing 48 may be knurled as at 54 in the right-hand part of FIG. 4, in order to prevent such axial shifts.

In the embodiment of FIGS. 3 and 4, it would be clear to one skilled in the art that the wing portions 32 of adjacent legs 26 may be held in abutment when the wing portions 32 are simply enclosed by smooth sections of housing 48. Preferably, the housing 48 acts in addition as a connecting element in that the housing envelope, as seen in FIG. 3, has outwardly pressed crimps 56 and the wings 32 are provided with corresponding outward pressings 58. The borders 60 of these outward pressings 58 form stops for the arms 16 and thereby limit the possible rotary movements between the two coupling portions 10 and 20 to an angular range in which the elastic intermediate pieces 28 are safe from overload.

In the embodiment according to FIGS. 1 and 2, the two coupling portions 10 and 20 are centered in relation to one another by the buffers 30 acting in conjunction with the slip surfaces 18. In the embodiment of FIGS. 3 and 4, such centering action is provided by the joint action of the outer ends of arms 16 with the outward pressings 58.

It will be appreciated that the wedge-shaped drivers of flange 44, as shown in FIG. 1, may be used in conjunction with the first coupling portion illustrated in FIG. 3 and that the driver portions 46 as shown in FIG. 3 may be used in conjunction with the first coupling portion illustrated in FIG. 1.

It will be understood that the claims are intended to cover all changes and modifications of the preferred embodiments of the invention herein chosen for the purpose of illustration which do not constitute departures from the spirit and scope of the invention.

What is claimed is:

1. In a flexible shaft-coupling of the type having three or more arms extending radially outward from a hub in star fashion to form a first coupling portion; an equal number of radial projections disposed between the arms, each radial projection being connected to a second coupling portion, said radial projections each having two legs that converge radially inward, said legs enclosing between themselves an internal cavity; and elastic intermediate pieces which are each connected to an arm and a leg of the radial projections and which are pre-stressed in a circumferential direction by the joining of the two coupling halves; the improvement comprising:

(a) each said radial projection, when viewed in the direction of the coupling axis, comprises legs arranged in V-shape, said legs being connected radially inward at a crest and each leg extending radially outward with a wing portion which protrudes in a circumferential direction;

(b) each said radial projection is supported against a driver of the second coupling portion which axially slides into the corresponding internal cavity;

(c) the wing portions of adjacent radial projections are held together by a connecting element comprising a tab at the end of one wing portion engaging a cut-out of the abutting wing portion of the adjacent projection; and (d) the drivers are clawlike projections of a flange of the second coupling portion, said clawlike projections are parallel to the axis, and have a cross-section that diminishes radially inward in a wedge-like fashion.

2. A flexible shaft-coupling comprising:

(a) a hub, said hub being adapted to receive a first shaft;

(b) at least three spaced arms extending from said hub;

(c) a plurality of radial projections equal in number to said arms, said radial projections being disposed, respectively, between said arms, said radial projections including two legs converging radially inward to a crest to form a V-shaped cavity therebetween, each of the legs extending outwardly and ending in a wing portion protruding circumferentially, a tab on one wing portion engaging a cut-out on an abutting wing portion of an adjacent radial projection for connection thereto;

(d) a plurality of elastic intermediate pieces disposed between each said leg and the adjacent arm and connected to said leg and said arm such that connection of the wing portions of the radial portion is operative to prestress the elastic pieces in the circumferential direction; and (e) driver means comprising inwardly projecting members for engaging the V-shaped cavities of said radial projections by a sliding fit therein and having a cross-section that diminishes radially inward, said driver means being connected to a shaft for rotation therewith.

3. The flexible shaft coupling of claim 2 wherein the driver means are inwardly-projecting clawlike members.

* * * * *